United States Patent [19]

Royer

[11] Patent Number: 4,459,973

[45] Date of Patent: Jul. 17, 1984

[54] SOLAR PANEL CONSTRUCTION FOR BUILDINGS

[76] Inventor: George R. Royer, 2137 Ragan Woods Dr., Toledo, Ohio 43614

[21] Appl. No.: 377,147

[22] Filed: May 11, 1982

[51] Int. Cl.³ ............................................. F24J 3/02
[52] U.S. Cl. .................................... 126/431; 126/417; 126/430; 52/173 R; 165/47; 165/53; 237/69
[58] Field of Search ............... 126/417, 428, 430, 431, 126/450, 400; 165/48 S, 49, 53, 47 A; 52/67, 173 R; 237/69

[56] References Cited

U.S. PATENT DOCUMENTS

| 3,991,937 | 11/1976 | Heilemann | 126/431 |
| 4,136,668 | 1/1979 | Davis | 126/431 X |
| 4,212,289 | 7/1980 | Hebert | 126/428 |
| 4,312,328 | 1/1982 | Leyman | 126/431 X |

FOREIGN PATENT DOCUMENTS

| 2416335 | 10/1979 | France | 126/417 |
| 52-46654 | 4/1977 | Japan | 126/431 |
| 56-10634 | 2/1981 | Japan | 126/431 |

Primary Examiner—Samuel Scott
Assistant Examiner—Margaret A. Focarino

[57] ABSTRACT

The subject invention is a movable solar panel apparatus adapted for slidable movement from areas outside of a building to areas inside such building; the invention comprising a generally spatial zone constructed inside the building generally adjacent a floor or ceiling area. Inside the spatial area are longitudinally extending guide members affixed on each side, such guide members being adapted to receive a longitudinally extending solar panel member adapted to move inside such internal spatial area, and then outside of the building to collect solar heat.

2 Claims, 5 Drawing Figures

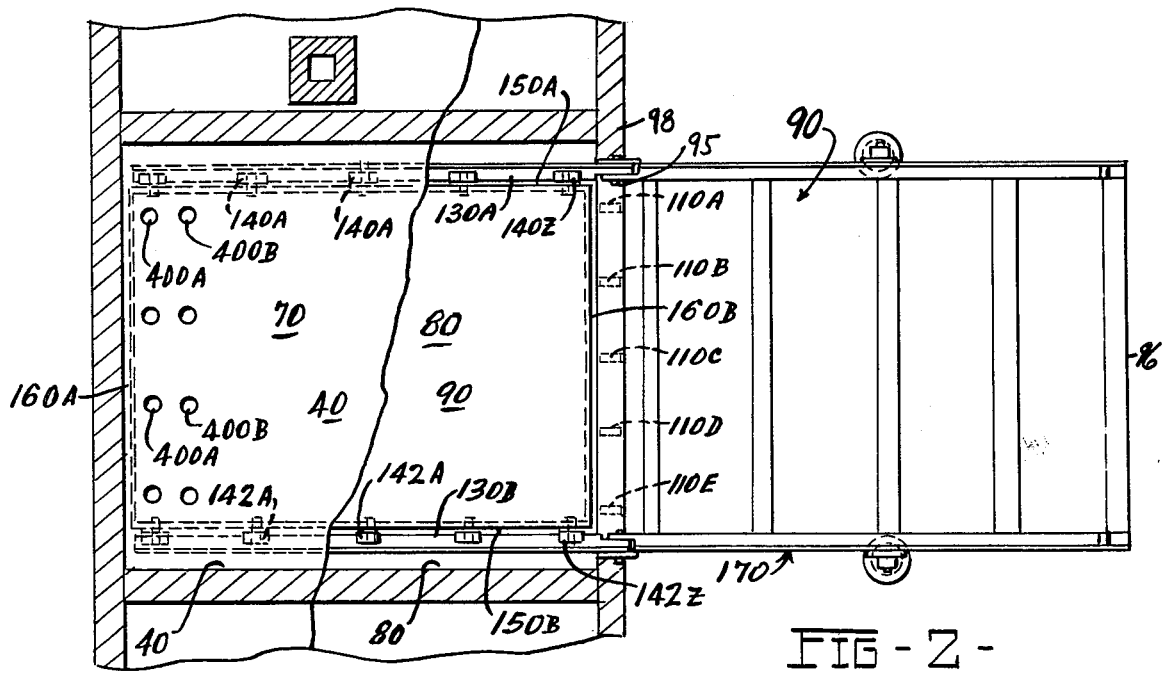
FIG-2-
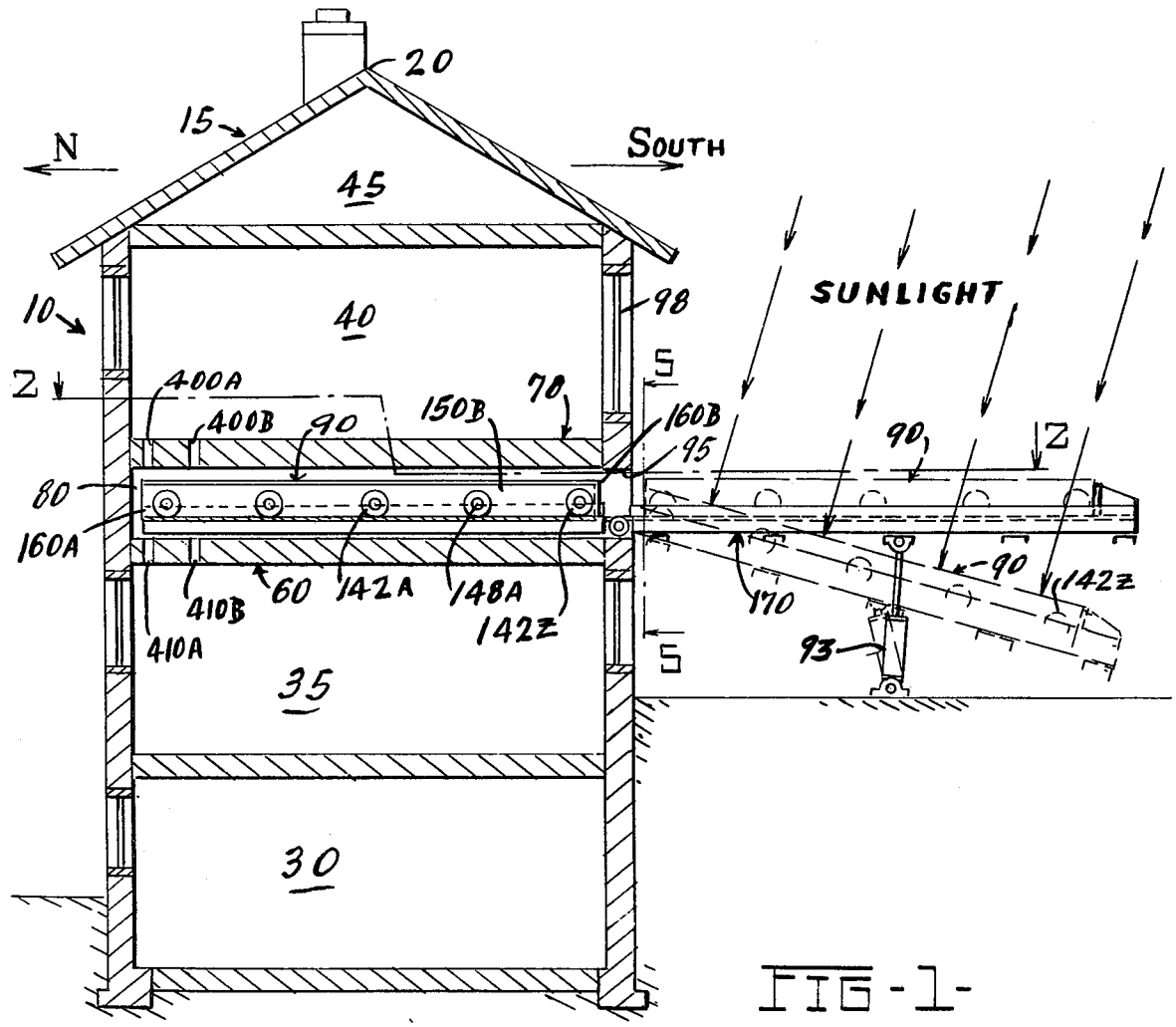
FIG-1-

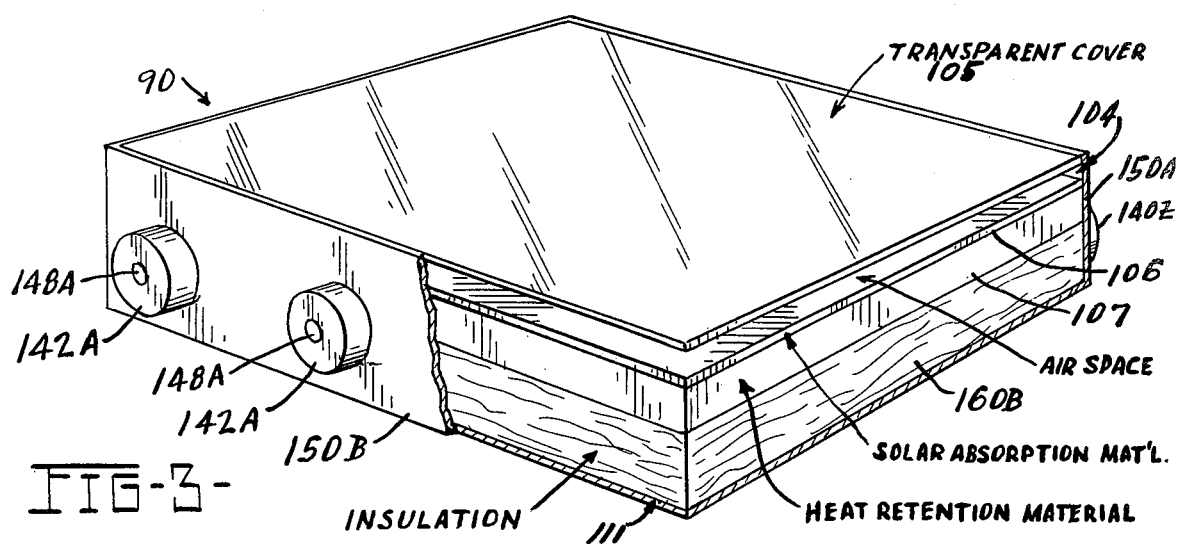
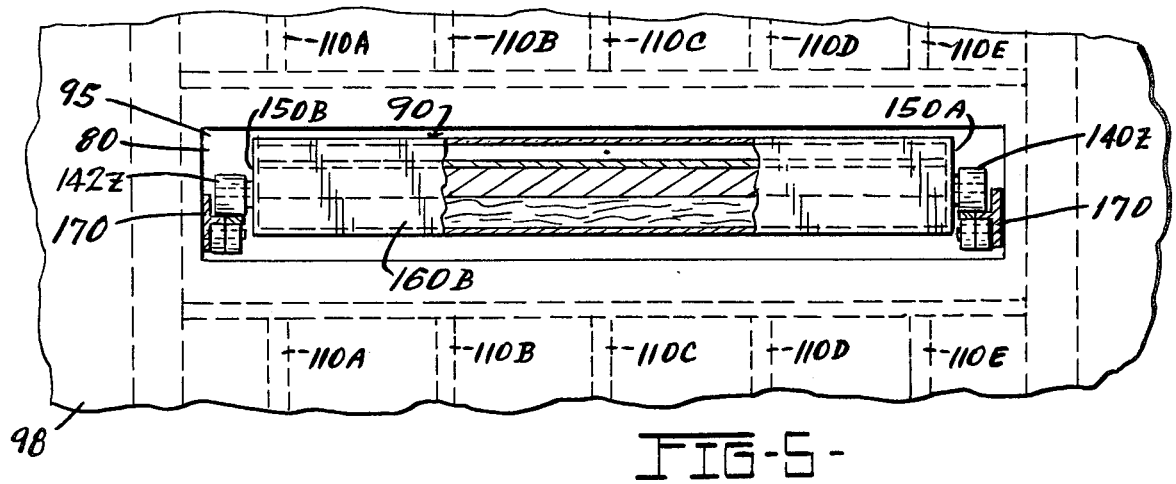
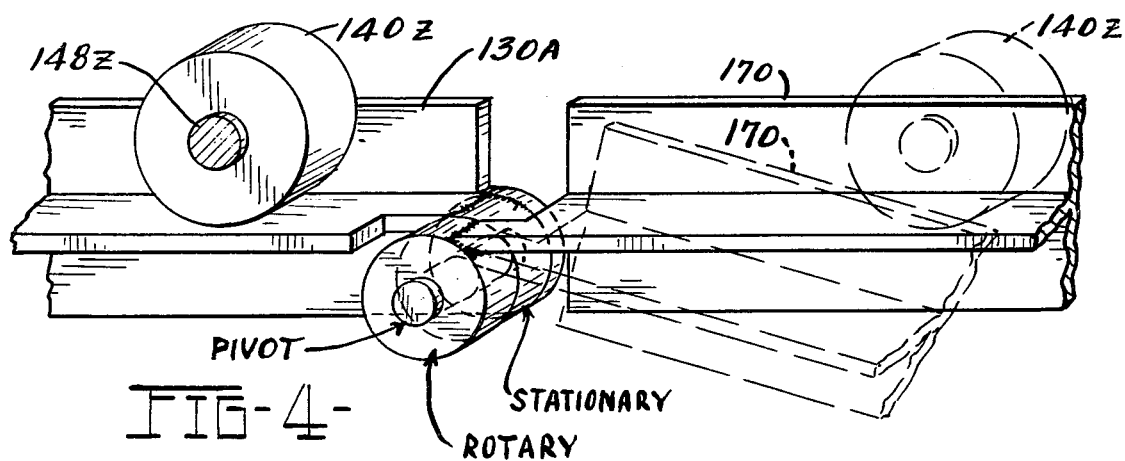

SOLAR PANEL CONSTRUCTION FOR BUILDINGS

BACKGROUND OF INVENTION AND DISCUSSION OF PRIOR ART

The subject invention relates to solar energy receptors which are generally adapted and used in building construction. In this respect, the subject invention particularly pertains to a building construction which incorporates solar heating panels which are movable from the outside to the inside of the building.

More specifically, the invention applies both to building construction features with integrally connected solar heating apparatus, with the building construction features incorporating means to receive from the outside to the inside a slideably mounted solar panel. In general, solar panel construction integrated into a building construction is obviously not novel as many buildings now incorporate solar receptors as an integral appendage to such building. Moreover, the use of movable panels which are adapted to move through various positions for optimal solar reception are also well known in the art. In this respect, the various array of solar building construction features which are known in the art represent a wide array of designs which are adapted to utilize all types of solar heating features.

While certain building constructions possess features which utilize statically disposed solar heating modules, most such solar heating devices are equipped and interconnected with internally disposed conduits and pumping mechanisms which transfer water, air, or other suitable media to transfer heat from the solar receptor to heat storage areas or internal building compartments. It is not generally disputed that such interconnected heat transfer equipment, including the necessary pumps, conduits, and storage tanks, results in substantially increased construction costs, as well as significant maintenance and operational costs. Additionally, this heat transfer process, with appendant equipment, often results in significant efficiency problems in the heat transfer process.

On the other hand, statically disposed solar receptors which are integrated into building walls or building roofs, do serve some useful purpose for building heating purposes. In this latter respect, a static receptor disposed, for example, as part of enlarged window area adjacent a room serves a very useful purpose. However, there are limitations on the utility of such static receptors. One such limitation is that a static solar receptor does not usually provide the internal heating efficiency necessary to substantially cover the heating needs for most internal building spaces, particularly on cold winter days, unless the building possesses unique features which may result in total internal environmental envelopment with solar heating apparatus. What many of these solar heating arrangements lack is an efficient and effective way of collecting and then utilizing a large proportion of the heat absorbed during the daylight hours.

The subject invention, as directed to building construction features, incorporating features which include the positive features of a static solar heating system without requiring expensive piping and pumping apparatus for heat transfer purposes, and further allows for maximal utilization of the heat input during daylight hours. This invention is thus directed to solve the foregoing problems discussed above.

Other features and objects of the subject invention will become apparent from a reading of the following objects:

OBJECTS

The following are objects of the subject invention:

It is an object of the subject invention to provide an improved building construction;

Another object of the subject invention is to provide an improved solar constructional arrangement for a building construction;

Another object of the subject invention is to provide a novel solar heating apparatus for a building;

Yet another object of the subject invention is to render a building construction which incorporates features of both dynamic and static heat transfer of solar heating features in a building;

Still another object of the subject invention is to provide an improved solar heating apparatus;

Still another object of the subject invention is to provide an improved solar reception mechanism that is movable from inside to outside a building, and back again, as needs dictate.

Other and further objects of the subject invention will become apparent from a reading of the following description taken in conjunction with the drawings.

DRAWINGS

In the drawings:

(1) FIG. 1 is a side elevational view in cross section of a building incorporating the subject invention showing the primary features of the subject invention;

(2) FIG. 2 is a top elevational view of the subject invention in section along a line 2—2 on FIG. 1;

(3) FIG. 3 is a perspective view of the solar receptor of subject invention;

(4) FIG. 4 is a detailed perspective view of the rail and pivoting apparatus for the solar panel apparatus;

(5) FIG. 5 is an elevational view along the line SS on FIG. 1 showing the arrangement of the rail members and building construction details of the subject invention.

DESCRIPTION OF GENERAL EMBODIMENT

The subject invention is a building structure which incorporates means to receive slidably mounted solar panels from areas outside the building to spatial areas inside thereof. Said building structure contains internally disposed spaces which are adapted to receive slidably mounted solar panel members, which are slidably mounted for movement from areas outside the building to areas within. Solar panels collect solar heat in the daylight hours and then are drawn into the internal spaces of the building at evening, or other required time intervals, for dissipation of the heat to other areas of the building.

The internally disposed spaces are equipped with side rails, or other means to receive the slidably movable solar receptor panels in a longitudinally movable fashion from inside to outside the building, and in again. The solar panels can optionally be pivotally mountable on the end thereof, so that each panel can be tilted downwardly towards the ground after it is slidably moved from the internally disposed space. This latter feature enhances the solar reception features of the panel, although it is not essential that the panel be tilted downwardly or upwardly, but can be disposed in a horizontal position.

DESCRIPTION OF THE PREFERRED EMBODIMENT

In describing the preferred embodiment of the subject invention, the following reference nomenclature will be used:

The word "upper" will be used in reference to areas of the building towards the upper part thereof.

The word "lower" will be used in reference to areas oriented towards the ground.

The word "lateral sides" will refer to the vertically disposed sides of a building, or any portion or subpart thereof;

The word "inside" will refer to areas contained inside the building.

The word "outside" will be used in reference to areas outside the building.

The words "solar receptor" will refer to any type of device which receives and absorbs solar radiation for use in interior building heating or other related purposes. For this purpose the word "solar panel" will be used interchangeably with the words "solar receiver" or "solar receptor".

The word "longitudinal" will be used to refer to that directional orientation of a part that extends over its longest extent. The words "longitudinal axis" will refer to the central, symmetrically disposed axis extending over the longitudinal extent of the object.

The word "lateral" will be used in reference to that dimension or directional orientation of a part which extends symmetrically in a generally perpendicular direction to the longitudinal axis over the second longest dimensional extent of such part.

Moreover, in describing the preferred embodiment, the following description will be directed to cover a residental building application. The invention herein will be understood to generally apply to buildings other than the residual type, and therefore any direct description and application to residential type structures should not be considered as a limitation of the scope of the subject invention. Additionally, it is to be stressed that the following description is of a specifically structured residential building, with multiple floor levels and other constructional features peculiar to that structural arrangement shown. Again by reference to a such a description of a preferred embodiment and its particular constructional attributes, shall not be considered as limiting the subject invention to such precise constructional features. Moreover, the subject invention may apply to any type of building, whether residential or not.

Referring now to the drawings in which a preferred embodiment is shown, and particularly to FIGS. 1 and 2. Specifically, shown in FIG. 1 is a cross-sectional view from a side elevation of a conventional structured shell for a two-story residential building 10. The residential building 10 is comprised of a roof 15 disposed on the upper part thereof, shown as being of the pitched variety, with peak 20. Building 10 is further comprised of four living levels, 30, 35, 40 and 45, comprising in particular, the basement area 30, the first floor area 35, the second floor area 40, and the attic area 45. The foregoing description is directed to a fairly conventional two story home with integral attic and basement areas, but it is to be understood that the subject invention and the principles thereof are equally applicable to building constructions of any shape, configuration or number of stories. Moreover, it is to be understood that the subject invention shall apply irrespective of whether or not a basement or attic exists in the building in question.

As shown in FIG. 1 the ceiling 60 forms the upper part of living space 35, while the floor 70 forms the lower part of living space 40. The internal spatial area 80 shown between floor 70 and ceiling 60 is that area which accommodates the solar receptor apparatus 90 when it is drawn inside the building 10 for heat dissipation purposes, as more fully described below.

As shown in FIGS. 1 and 5, the generally parallelopiped spatial area 80 is generally open or exposed to the outside through the rectangularly shaped opening 95 situated in outer vertical wall 98 in building 10. It is preferable to have such opening 95 disposed in a wall which faces south, in northern hemisphere locations, or in that wall of a building in whatever location that receives that most sunshine. It is this relatively more sun-exposed wall 98 to which the subject solar reception apparatus 90 is affixed for entrance and exit through rectangular opening 95, as more fully described hereinbelow:

In the preferred embodiment of the subject invention, the rectangularly shaped opening 95 is of such a size as to be just slightly smaller than the comparably shaped end wall 96 of the solar receptor 90, such that when the solar receptor 90 is completely moved inside the spatial area 90, the opening 95 is substantially covered. Alternately stated, the opening 95 is of such a size as to leave little clearance around the rectangular end wall 96 of the solar receptor 90, when the receptor is completely enclosed in the spatial area 80. Additionally, a movable slide or flap, not shown, can be moved into position over the opening 95 to prevent egress of warmed air, or conversely to prevent the ingress of relatively cooler air into the spatial area 80.

For purposes of constructing the framework of building 10 in order to accommodate the spatial area 80 between the upper area 40 and lower area 35, vertical support studs 110A, 110B, 110C of such framework are discontinuous from the lower to the upper part of the house 10 in the side wall 98 of the house 10 adjacent the opening 95 and in areas of the spatial area 80. More specifically, the studs 110A, 110B, 110C along wall 98 are necessarily discontinuous in such limited area of opening 95, since such area of opening 95 must be unobstructed to allow such reception of solar receptor 90. Other verical and horizontal framework structures of building 10 in the zone of spatial area 80 must also be rendered discontinuous, as can be observed in order that the solar reception device 90 can be moved in and out of the spatial area 80 without interference.

In the preferred embodiment of the subject invention, the spatial area 80 which receives the solar panel will preferably not encompass the entire width or length of the building 10, otherwise there would be a problem with structural integrity for vertical support purposes. In this respect, it is not necessary to emplace such a solar receptor 90 under all floor areas for gaining the requisite heating advantage. The spatial area 80 between living areas 40 and 35 will preferably be above supportive vertical joists, since such support is essential to help support the solar panel. Moreover, the horizontal support section which comprises ceiling 60 on its lower surface will be sufficiently supported on its opposing ends in sidewalls of building 10 to carry part of the weight of the solar panel member 90 as its rests in spatial area 80, as shown in FIG. 1.

Attention is addressed to FIG. 3 in which is shown the solar reception panel 90 constructed to receive solar energy on its upper transparent, covering surface 105. In general, solar panel 90 is of conventional constructional arrangement, with such upper surface 105 comprising a transparent shield to admit and pass solar rays therethrough into airspace area 104 just beneath the transparent cover 105 as shown. Immediately beneath the airspace area 104 is solar reception layer 106 comprised of solar absorption material. Just beneath reception layer 107 is a heat retention layer 107 of heat retention substance. Such a heat retention layer 107 can be comprised, for example, of a self-contained layer of water. Other suitable heat absorption and retention materials or substances can be used, however, whether of a liquid, gaseous or solid state. Just beneath the heat retention level 107 is insulation layer 160B, as shown, which insulation level is situated just above the extreme bottom support layer 111 of the solar reception panel, as shown in FIG. 3.

Analysis of FIGS. 1 and 2 shows the inner and outer positions of the solar panel 90 relative to building 10. More specifically, the solar panel 90 can be completely disposed inside the spatial area 80, or drawn completely outside, in a longitudinal movement, to the outside of southerly wall 98 of building 10, as represented in FIGS. 1 and 2. When the solar panel 90 is drawn to the outside as shown in FIG. 2, the upper transparent surface 105 of panel 90 is disposed upwardly towards the sunlight in order to receive and absorb the sun's rays, as schematically represented in FIG. 1. Such drawn-out disposition of FIGS. 1 and 2 can assume several vertically disposed positions, such as the horizontal position shown in FIG. 1, or a tilted down position of variable degree, as shown in phantom also in FIG. 1. More specifically, the tilted down position shown in FIG. 1 is the optimal position for solar reception purposes. Such tilting can be accomplished, for instance, by a pneumatically operated jack 93, shown in FIG. 1. In temperate zones of the Northern Hemisphere, for instance, the most optimal position for solar reception is at an angle of approximately forty-five degrees to the vertical. This angled position is not essential however, as solar reception 90 can still be consummated on a relatively efficient basis in the horizontal position indicated in FIG. 1.

The horizontal position of solar receptor 90 shown in FIG. 1 can be assumed, for instance, by merely positioning the solar receptor 90 on the ground or on an adjacent patio near the first floor level of the home. This latter positioning would presuppose a ground level even with the first floor level, and not the structural situation shown in FIG. 5. In this regard, the subject invention, as described, is thus not merely limited to the structural arrangements shown in the drawings, as various structural arrangements are foreseeable in this respect.

Referring now to the FIGS. 1 and 5, which show a detailed view of the spatial area 80, which accommodates the solar reception panel 90, such spatial area 80 is flanked on each side thereof by rail guide members 130A and 130B, as shown. Such rail guide members 130A and 130B are adapted to receive roller members 140A, 140B . . . 140Z, and roller members 142A, 142B . . . disposed on each lateral side 150A and 150B respectively of the solar panel member 90. More particularly, the rectangularly configured panel member 90 with its respective sides 150A and 150B is equipped with rotatably mounted roller members 140A and 140B . . . 140Z disposed in the lateral side 150A and roller members 142A, 142B . . . 142Z rotatably mounted on side 150B, as shown in FIGS. 1, 2, 3 and 5. Each such roller member is disposed on a fixed non-rotatable shaft 148A, 148B . . . 148Z on lateral side 150A and on similarly disposed shaft members on lateral side 150B on the solar panel member 90. As shown in the particular features of the drawing of FIG. 4, the upper and lower portions of rails 142A and 142B are adapted to receive the upper and lower circumferential peripheries of the respective roller members on the lateral sides of the solar panel member 90, as shown. Such rollers thus freely rotate in either direction on the shaft members and thus serve to facilitate the movement of the solar panel 90 in and out of the spatial area 80, as shown. As can be seen, the solar panel 90 can therefore be moved longitudinally along guide rails 130A and 130B by means of such multiple roller members rotatably disposed therein. This serves to facilitate the movement of the solar panel 90 in and out of spatial area 80, as desired. Additionally, as shown in FIGS. 1 and 4, the panel 90 can pivot downwardly in a tilted position to allow distal end 96 of panel 90, to rest on the ground, if it is desired to use such panel in a tilted position. Again, as stated above, it is not necessary that the panel 90 be tilted downwardly to be used. Moreover, in some instances where the floor levels of the building are even with the ground, there is no choice but to allow the panel to rest against the ground in a horizontal position.

In order to move the panel 90 in and out of the building 10, auxiliary motor means, not shown, can be used to effect such movement. This latter aspect is an optional feature and manual means can be used to move the panel 90 in and out of spatial area 80.

The basic heat exchange operation of the subject system is relatively simple and straight forward. During daylight hours the sun's rays impinge on the upper surface 105 of panel 90, said solar energy passing through the various layers of panel 90 the heat retention layer 107. As stated above, the preferred composition of heat retention layer 107 is water, and it is the function of this latter layer to absorb and retain solar generated heat therein during such daylight operation. Then, during the evening hours, the panel 90 is moved to the inside of spatial area 80, where the heat retained in heat retention layer 107 of panel 90 is allowed to dissipate in the areas of spatial area 80. In order to facilitate the transfer of the resultant heat from spatial area, heat transfer pipes 400A, 400B . . . are disposed in floor 70 under living area 40. Similarly heat transfer pipes 410A, 410B . . . are situated in the ceiling area 60 above living area 35 to transfer heat from spatial area 80 to living area 35. As can be seen, the subject system is comparatively simplistic, as it employs no pumps, and concomitant complex plumbing system for heat transfer purposes. Moreover, the system does not entail a water pumping system, which frequently can prove damaging to the surrounding building structure.

The subject invention, as described above, is only one possible embodiment of several, and as a consequence the foregoing description shall not be considered as limiting the scope of the subject invention.

I claim:

1. A building construction having one or more story levels within the building utilized for living purposes in combination with movable solar radiation absorption panels, said combination comprising:

(a) a building having one or more living areas on each story level, said building having vertical walls separating said living areas from the area outside the building and having a floor under each said story level, wherein one or more of said living areas are disposed above each said floor, with one or more solar panel storage spatial areas disposed beneath at least a portion of the floor under the respective living area, each said solar panel storage spatial area having an opening extending between said solar panel storage spatial area and an adjacent vertical wall to said area outside the building;

(b) support and transport means within the solar panel storage spatial area beneath each floor to receive and hold a solar panel member within said solar panel storage spatial area;

(c) a separate solar panel member mounted for slidable movement on the support and transport means in each of the solar panel storage spatial areas, whereby each such mounted solar panel is movable to the solar panel storage spatial area, from an area outside the building through said opening extending between the solar panel spatial area and said area outside the building;

(d) heat transfer means disposed between and connecting each said solar panel storage spatial area and the living area adjacent each floor.

2. A building construction having one or more story levels within the building utilized for functional living purposes in combination with movable solar radiation absorption panels, said combination comprising:

(a) a building having one or more functional living areas on each story level, said building having vertical walls separating said functional living areas from the area outside the building and having a floor under each said story level, wherein one or more of said functional living areas are disposed above each said floor, with one or more solar panel storage spatial areas disposed beneath at least a portion of the floor under the respective functional living area, each said solar panel storage spatial area having an opening extending between said solar panel storage spatial area and an adjacent vertical wall to said area outside the building;

(b) support and transport means within the solar panel storage spatial area beneath each floor to receive and hold a solar panel member within said solar panel storage spatial area;

(c) a separate solar panel member mounted for slidable movement on the support and transport means in each of the solar panel storage spatial areas whereby each such mounted solar panel is movable to the solar panel storage spatial area from an area outside the building through said opening extending between the solar panel storage spatial area and said area outside the building;

(d) heat retention means in said solar panel member to retain the solar absorbed heat for subsequent dissipation of said heat from said solar panel member into said solar panel storage spatial area;

(e) heat transfer means disposed between said connecting each said solar panel storage spatial area and said functional living area adjacent each floor.

* * * * *